US012667944B2

(12) United States Patent
Chen

(10) Patent No.: US 12,667,944 B2
(45) Date of Patent: Jun. 30, 2026

(54) SCREWDRIVER BIT COUPLING STRUCTURE OF HAND TOOL

(71) Applicant: YIH CHENG FACTORY CO., LTD., Nantuo (TW)

(72) Inventor: Wei-Cheng Chen, Nantuo (TW)

(73) Assignee: YIH CHENG FACTORY CO., LTD., Nantuo (TW)

( * ) Notice: Subject to any disclaimer, the term of this patent is extended or adjusted under 35 U.S.C. 154(b) by 367 days.

(21) Appl. No.: 18/428,513

(22) Filed: Jan. 31, 2024

(65) Prior Publication Data

US 2025/0242480 A1 Jul. 31, 2025

(51) Int. Cl.
*B25B 23/00* (2006.01)

(52) U.S. Cl.
CPC ................................ *B25B 23/0035* (2013.01)

(58) Field of Classification Search
CPC ... B25B 23/0035; B25B 15/02; B25B 15/004; B25B 15/008; B25G 3/10; B25G 3/12; B25G 3/14; B25G 3/16; B25G 3/20; B25G 3/24; B25G 1/043; B25G 1/06; B25G 1/063
USPC ................................... 81/487, 491; 279/46.7
See application file for complete search history.

(56) References Cited

U.S. PATENT DOCUMENTS

| | | | | |
|---|---|---|---|---|
| 4,404,874 | A * | 9/1983 | Lieser | B25B 15/00 81/439 |
| 5,335,409 | A * | 8/1994 | Elvebak | B25B 15/02 29/451 |
| 9,138,316 | B2 * | 9/2015 | Bielefeld | A61F 2/2496 |
| 10,092,302 | B2 * | 10/2018 | Overes | B25G 3/18 |
| 10,603,169 | B2 * | 3/2020 | Bielefeld | B25B 23/0064 |
| 11,207,772 | B2 * | 12/2021 | Hu | B25G 1/125 |
| 11,597,073 | B2 * | 3/2023 | Lin | B25B 23/0042 |
| 2020/0078925 | A1 * | 3/2020 | Wang | B25B 23/0035 |

* cited by examiner

*Primary Examiner* — David B. Thomas
(74) *Attorney, Agent, or Firm* — HDLS IPR SERVICES; Chun-Ming Shih

(57) ABSTRACT

This disclosure is directed to a screwdriver bit coupling structure (1) having a screwdriver base (20) and a ring plug (30). The screwdriver base (20) includes a fixing base (21) and a fixing cylinder (22). The fixing cylinder (22) includes an embedding recess (221) and an engaging recess (222). The fixing cylinder (22) has an outer end edge (223). The ring plug (30) includes an elastic segment (31) and an abutting segment (32). The abutting segment (32) is pressed by the outer end edge (223). The screwdriver bit (2) is inserted into the embedding recess (221) through the ring plug (30). The screwdriver bit (2) is pressed by the elastic segment (31) to be firmly fixed in the engaging recess (222).

10 Claims, 9 Drawing Sheets

SCREWDRIVER BIT COUPLING STRUCTURE OF HAND TOOL

BACKGROUND

Technical Field

This disclosure relates to hand tools, particularly to a screwdriver hand tool.

Related Art

Hand tools are one of the necessary tools when engaged in telecommunications maintenance or water and electricity configuration, especially screwdrivers. In addition, since related-art screws are provided with various types and specifications, in the market, a related-art multi-functional screwdriver hand tool having a replicable the tool bar at the front of the handle is provided for the aforementioned using requirements.

Furthermore, most of the related-art approaches for coupling a tool bar with a handle of a multi-function screwdriver are directed to a steel locking ball disposed in the handle for positioning. However, since no insulation structure is disposed between the tool bar and the handle, a current in a high-voltage environment tends to be conducted from the tool bar to the handle, and this leads to electric shock and harm to the body. In addition, another approach for coupling the tool bar with the handle is directed to an insulative end plug disposed in the handle for positioning. However, the insulative end plug tends to escape from the handle, because a strength of the fastening between the end plug and the handle is insufficient, so that it does not meet the needs of use.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of this disclosure is to provide a screwdriver bit coupling structure of hand tool, whose ring plug is pressed by the outer end edge of the fixing cylinder to be firmly coupled to the screwdriver base to make a screwdriver bit firmly coupled in the ring plug.

To accomplish the above object, this disclosure provides a screwdriver bit coupling structure of hand tool, used for coupling a screwdriver bit, which includes a handle, a screwdriver base, a ring plug and an O-ring. The handle has a front end coupled to the screwdriver bit. The screwdriver base includes a fixing base and a fixing cylinder connected to the fixing base. The fixing cylinder includes an embedding recess and an engaging recess communicating with the embedding recess. The screwdriver base is coupled to the handle. The fixing cylinder has an outer end edge. The ring plug is made of an insulative material and includes an elastic segment and an abutting segment connected to the elastic segment. The elastic segment is inserted into the engaging recess. The abutting segment abuts against the engaging recess and is pressed by the outer end edge of the fixing cylinder. The O-ring is disposed between an outer surface of the elastic segment and an inner surface of the engaging recess. The screwdriver bit is inserted into the embedding recess through the ring plug. The screwdriver bit is pressed by the elastic segment to be fixed in the engaging recess.

In comparison with the related art, the screwdriver bit coupling structure of hand tool of this disclosure is disposed with a screwdriver base and a ring plug in the handle. The screwdriver base has a fixing cylinder with an engaging recess. The ring plug is disposed in the engaging recess and includes an elastic segment and an abutting segment. The abutting segment is pressed by the outer end edge of the fixing cylinder so as to be firmly coupled to the screwdriver base. Thus, the elastic segment is expanded when the screwdriver bit is inserted into the ring plug. At this time, the O-ring is pressed to be deformed, and the elastic segment will continuously press the screwdriver bit because of the flexible returning force to make the screwdriver bit firmly coupled in the ring plug. In addition, the ring plug is deposed bet went the screwdriver bit and the handle use to improve insulation, so that current will not be conducted to the handle and the safety of operation is improved.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
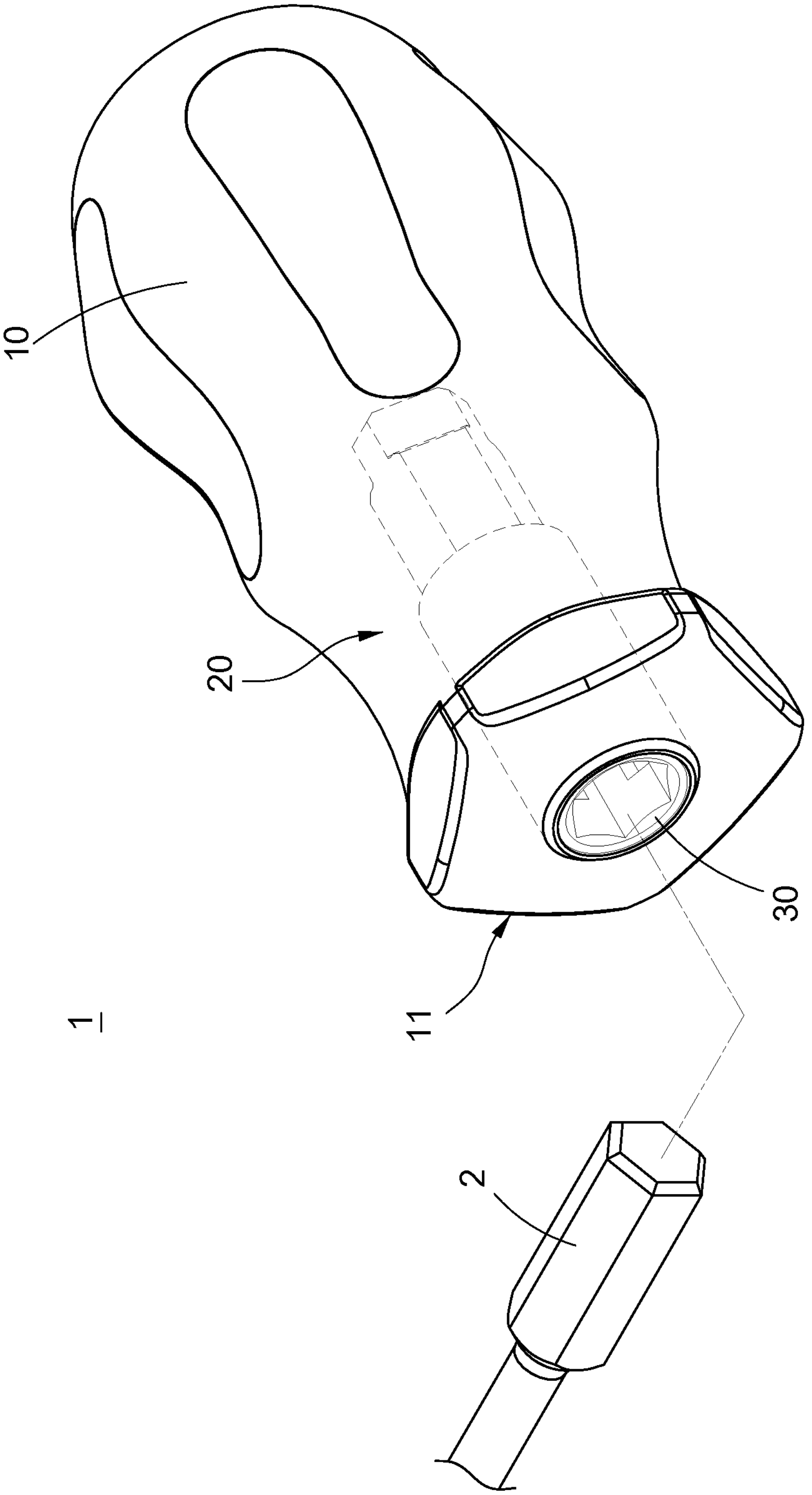
FIG. 1 is a schematic view showing that the screwdriver bit coupling structure of hand tool of this disclosure is coupled with a screwdriver bit.
Figure 2:
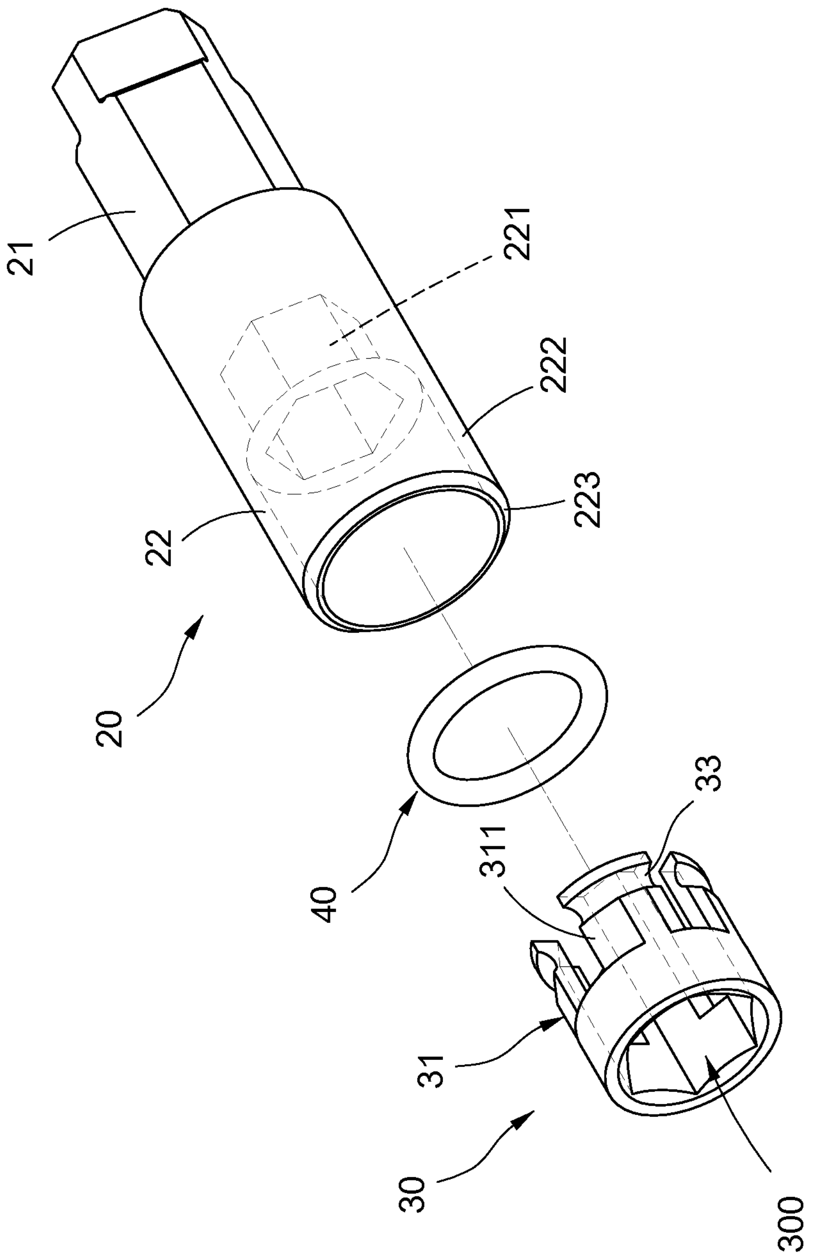
FIG. 2 is an exploded view showing a portion of the screwdriver bit coupling structure of hand tool according to this disclosure.

Please refer to FIGS. 1 and 2, which are respectively a schematic view showing the screwdriver bit coupling structure of hand tool coupled with a screwdriver bit according to disclosure and an exploded view showing the screwdriver bit coupling structure of hand tool according to this disclosure. The screwdriver bit coupling structure 1 of this disclosure includes a handle 10, a screwdriver base 20, a ring plug 30 and an O-ring 40. The screwdriver base 20 is coupled to a front end of the handle 10. The ring plug 30 is surrounded by the O-ring 40 and inserted through the screwdriver base 20 for coupling with a screwdriver bit 2. The screwdriver bit coupling structure 1 will be further described as bellow.

It is noted that, in actual operations, the screwdriver bit 2 may be configured to be various types such as a Phillips screwdriver bit or a flat screwdriver bit to meet different working needs.

The handle 10 is made of an insulative material and has a front end 11 coupled to the screwdriver bit 2.

The screwdriver base 20 is made of metal and coupled into the handle 10. The screwdriver base 20 includes a fixing base 21 and a fixing cylinder 22 connected to the fixing base 21. The fixing cylinder 22 includes an embedding recess 221 and an engaging recess 222 communicating with the embedding recess 221. Also, the fixing cylinder 22 has an outer end edge 223. In some embodiments, the embedding recess 221 is configured to be of a hexagonal shape.

The ring plug 30 is made of an insulative material such as plastic or rubber. Also, the ring plug 30 has a hollow portion 300 of a hexagonal shape. In detail, the ring plug 30 includes an elastic segment 31 and an abutting segment 32 connected to the elastic segment 31. The elastic segment 31 is inserted into the engaging recess 222. The abutting segment 32 abuts against the engaging recess 222 and is pressed by the outer end edge 223 of the fixing cylinder 22.

In detail, the elastic segment 31 is disposed with a groove 33. Also, the elastic segment 31 includes a plurality of elastic claws 311. The groove 33 is defined on the elastic claws 311 respectively. In an embodiment of this disclosure, the groove 33 is configured to be of an arcuate or V shape, but not limited to these.

Moreover, the O-ring 40 is sandwiched between the elastic segment 31 and the fixing cylinder 22 and may be made of a flexible material such as plastic. In the embodiment, the O-ring 40 is disposed in the groove 33 and sleeves the elastic segment 31.

Figure 3:
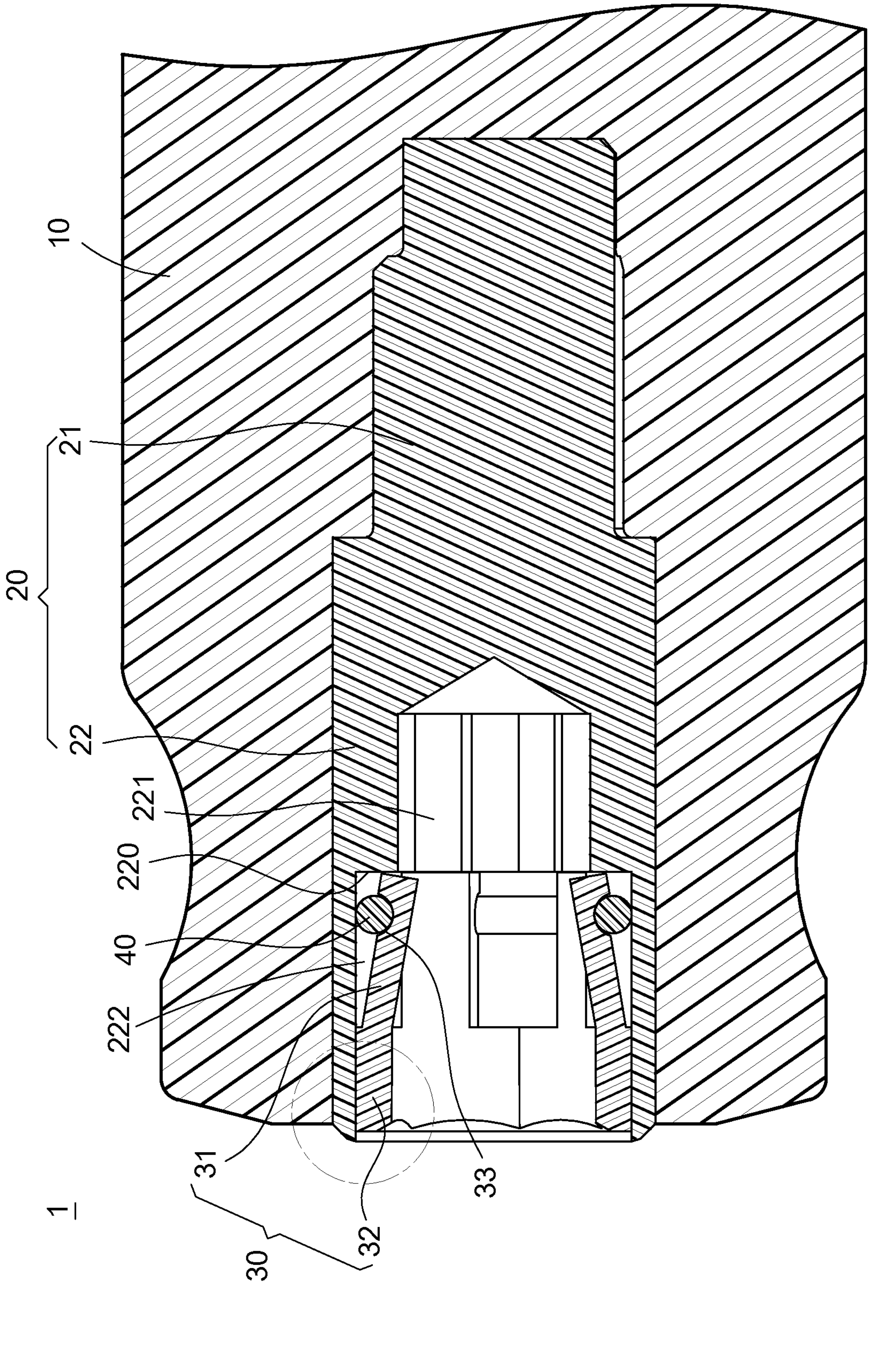
FIGS. 3 and 4 are cross-sectional views of the screwdriver bit coupling structure of hand tool of this disclosure.
Figure 4:
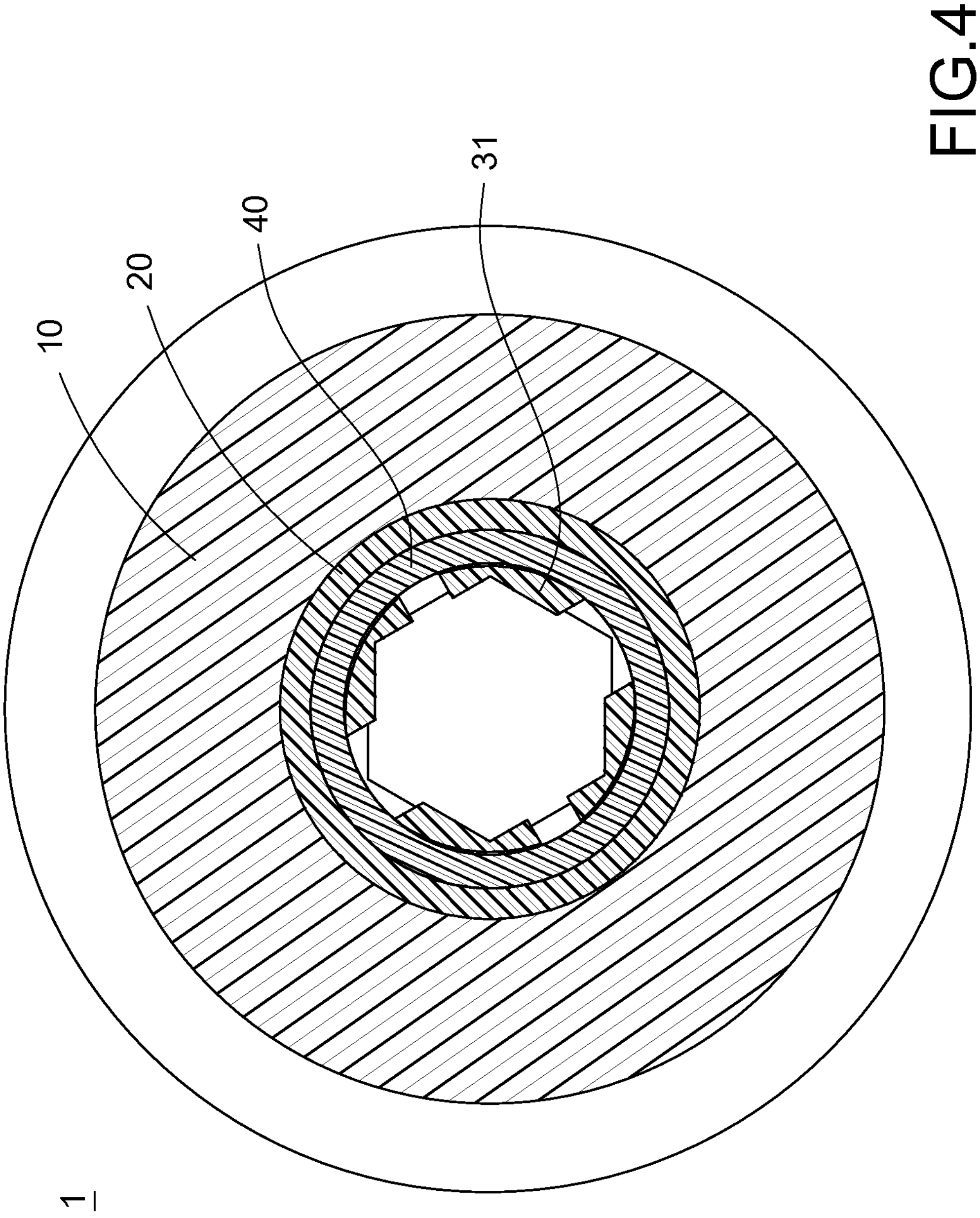

Please refer to FIGS. 3 and 4, which are cross-sectional views of the screwdriver bit coupling structure of hand tool of this disclosure. As shown, the screwdriver base 20 is coupled in the handle 10. The O-ring 40 surrounds the ring plug 30 and is disposed between an outer surface of the elastic segment 31 and an inner surface of the engaging recess 222. The ring plug 30 is inserted through the screwdriver base 20.

In detail, the screwdriver base 20 includes the fixing base 21 and the fixing cylinder 22. The fixing base 21 and the fixing cylinder 22 are embedded in the handle 10. In addition, the fixing cylinder 22 includes the embedding recess 221 and the engaging recess 222. A step 220 is formed between the embedding recess 221 and the engaging recess 222. Also, the ring plug 30 includes the elastic segment 31 and the abutting segment 32. An end of the elastic segment 31 abuts against the step 220.

Figure 5:
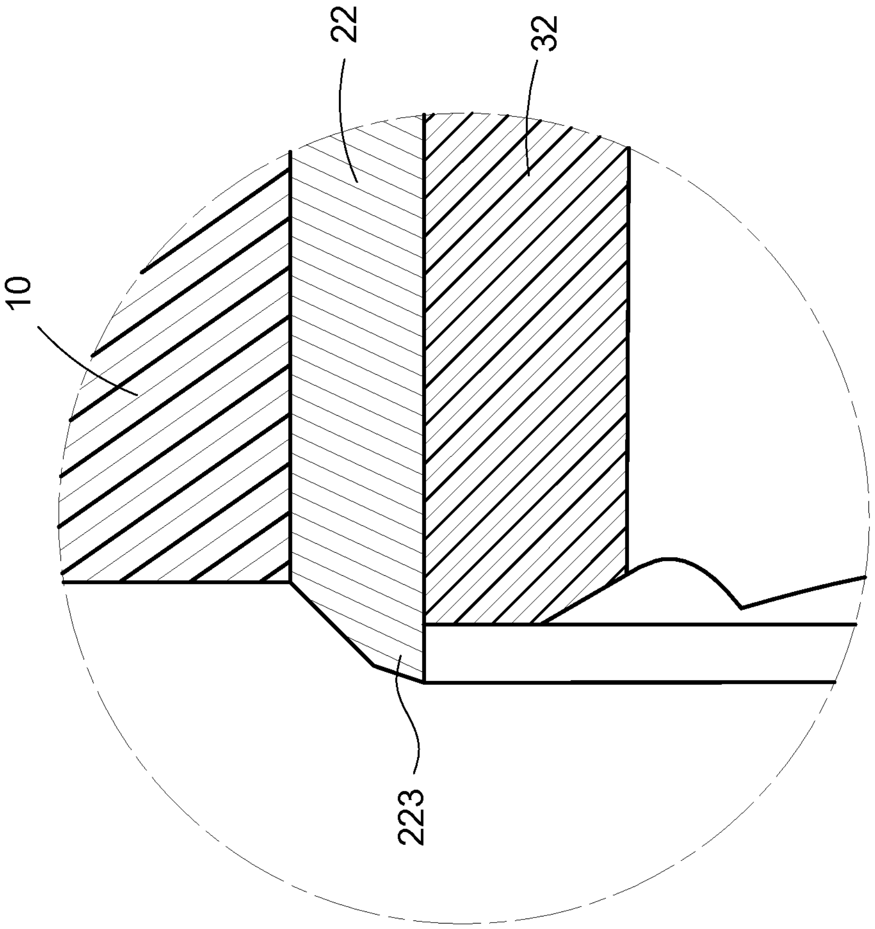
FIGS. 5 and 6 are enlarged cross-sectional views showing a portion of the screwdriver bit coupling structure of hand tool according to this disclosure.
Figure 6:
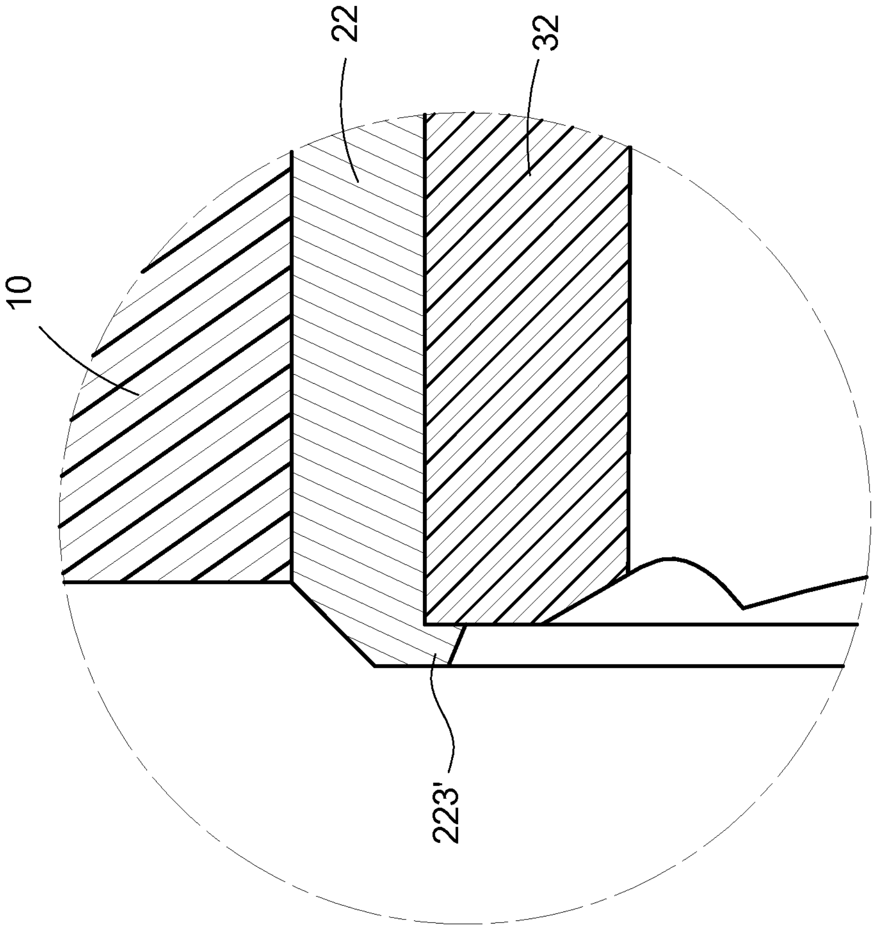

Please refer to FIGS. 5 and 6, which are enlarged cross-sectional views showing a portion of the screwdriver bit coupling structure of hand tool according to this disclosure. As shown in FIG. 5, when the ring plug 30 is assembled in the fixing cylinder 22 of the screwdriver base 20, the outer end edge 223 of the fixing cylinder 22 is slightly higher than the abutting segment 32. Then, the outer end edge 223 will be pressed. Please refer to FIG. 6, the outer end edge 223' which has been pressed will wrap a corner of the abutting segment 32. That is, the abutting segment 32 is pressed by the outer end edge 223' which has been pressed so as not to separate from the screwdriver base 20.

Figure 7:
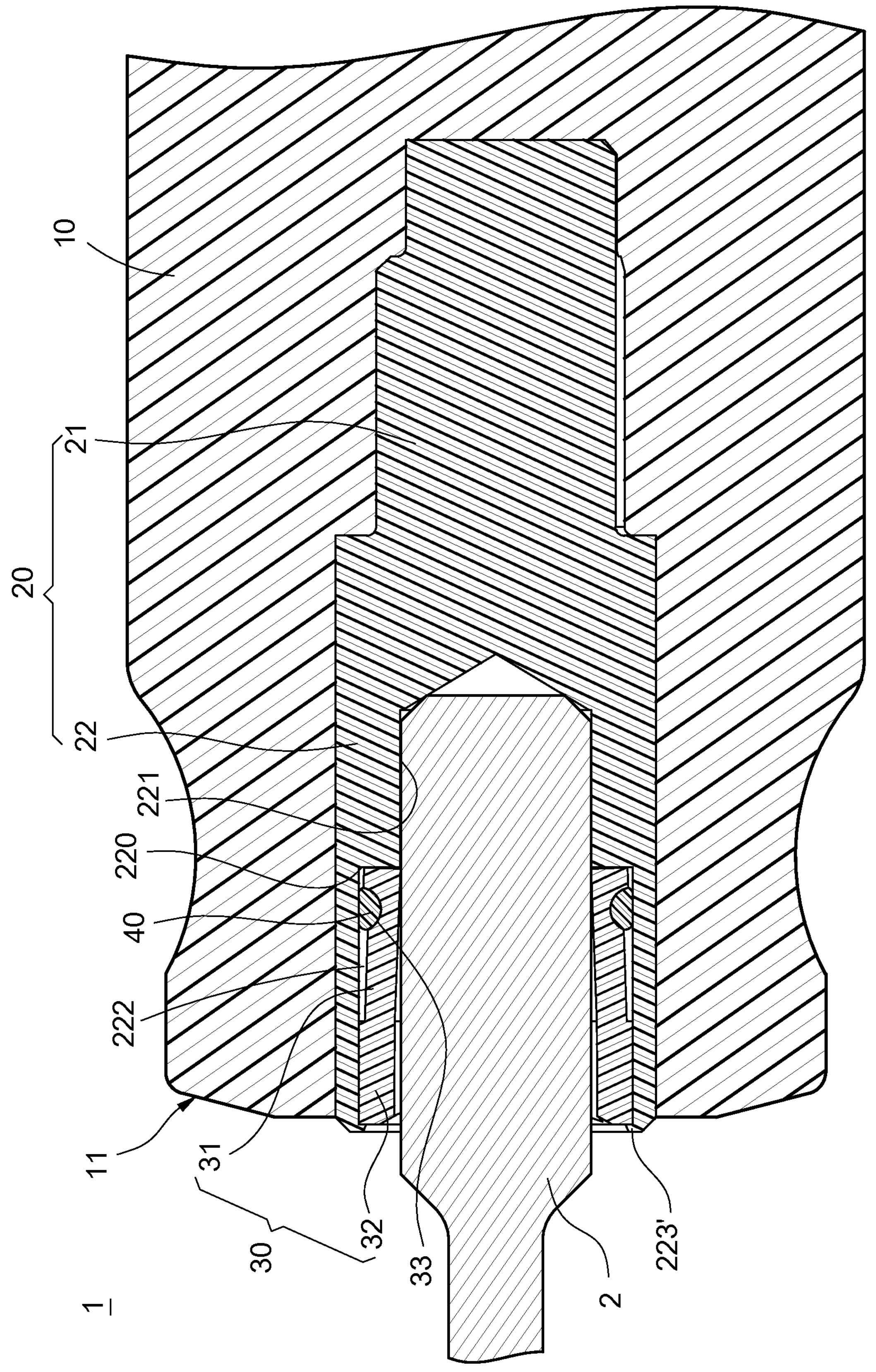
FIGS. 7 and 8 are cross-sectional views showing the screwdriver bit coupling structure of hand tool coupled with a screwdriver bit according to this disclosure.
Figure 8:
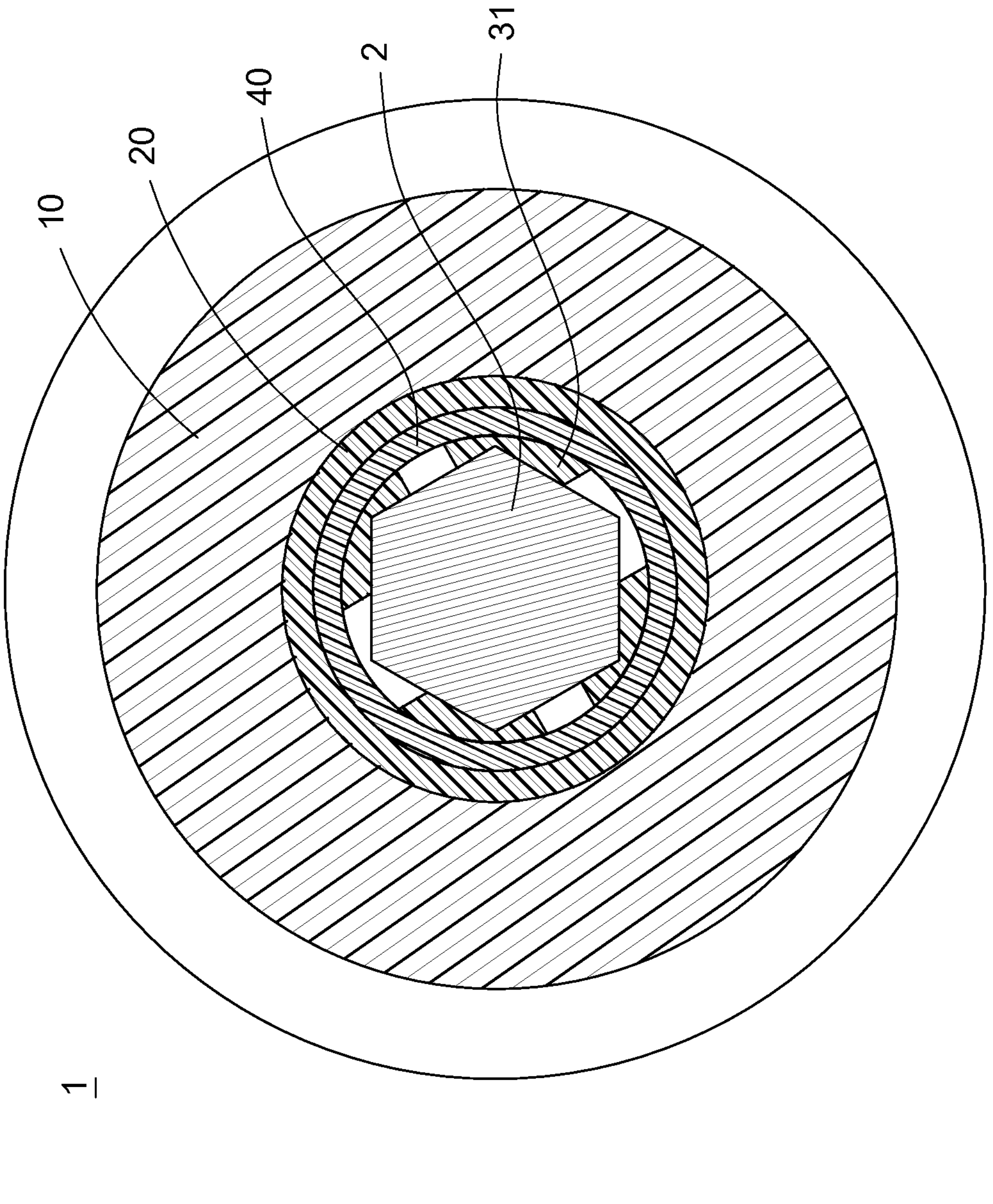

Please refer to FIGS. 7 and 8, which are cross-sectional views showing the screwdriver bit coupling structure of hand tool coupled with a screwdriver bit according to this disclosure. The screwdriver bit coupling structure 1 of hand tool of this disclosure is used to couple a screwdriver bit 2. The screwdriver bit 2 is inserted into the embedding recess 221 of the screwdriver bit 20 through the ring plug 30. Accordingly, the screwdriver bit 2 is pressed by the elastic segment 31 and fixed in the engaging recess 222.

In detail, the elastic claws 311 of the elastic segment 31 is expanded when the screwdriver bit 2 is inserted into the ring plug 30, the O-ring 40 is meanwhile pressed to be deformed, and the screwdriver bit 2 will be continuously pressed by a flexible returning force from the elastic claws 311 so that the screwdriver bit 2 is firmly coupled in the ring plug 30.

It is noted that the screwdriver bit 2 is inserted in the ring plug 30 and replaceable. The screwdriver bit 2 protrudes out from the handle 10. In addition, the screwdriver bit 2 and the handle 10 use the ring plug 30 therebetween to improve insulativity. Thus, current will not be conducted to the handle 10 when the screwdriver bit 2 is in contact with current.

Figure 9:
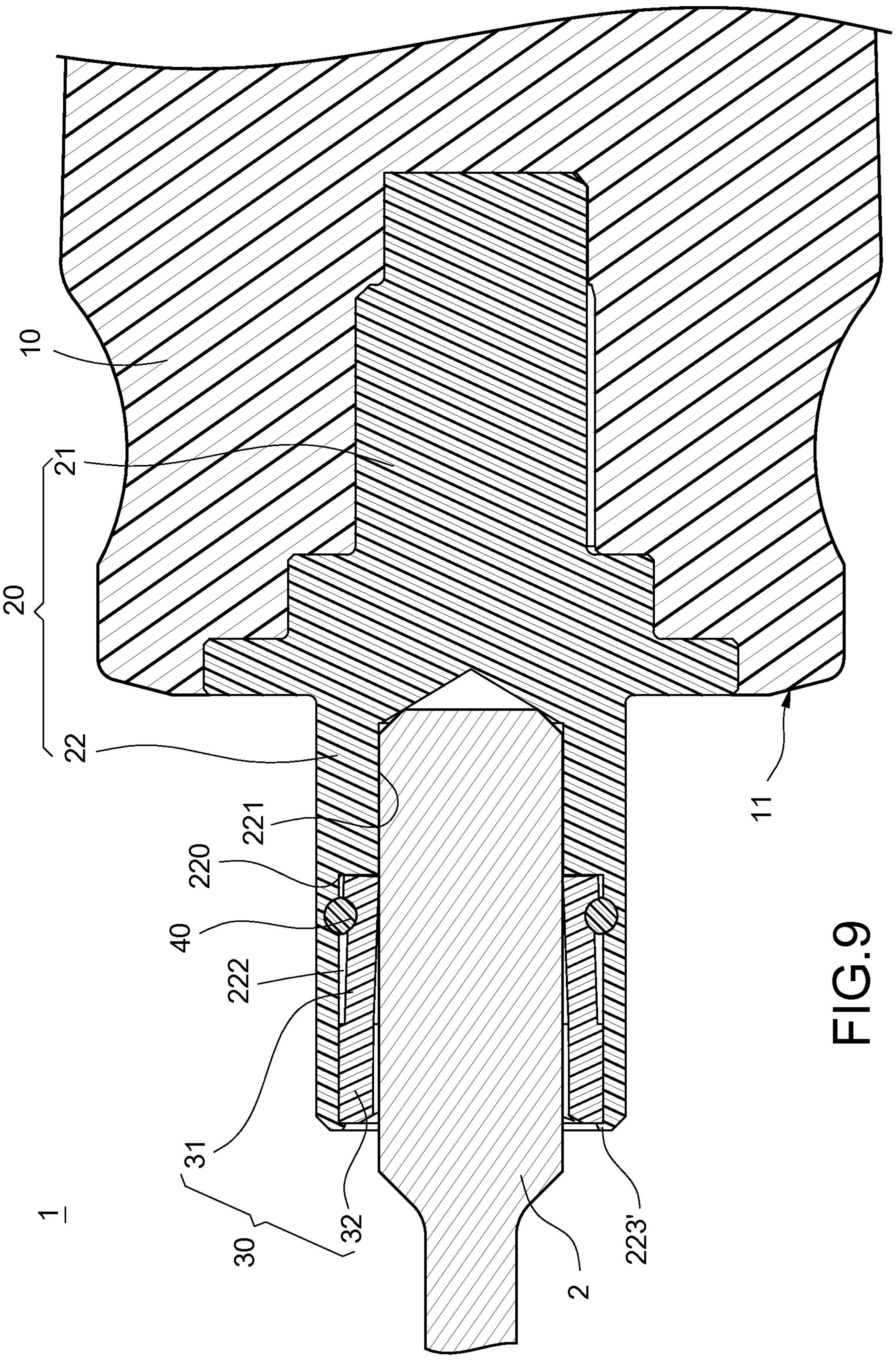
FIG. 9 shows another embodiment of the screwdriver bit coupling structure of hand tool according to this disclosure.

Please refer to FIG. 9, which shows another embodiment of the screwdriver bit coupling structure of hand tool of this disclosure. In the embodiment, the screwdriver bit coupling structure 1 of this disclosure includes a handle 10, a screwdriver base 20, a ring plug 30 and an O-ring 40. The screwdriver base 20 is coupled to a front end of the handle 10. The ring plug 30 is surrounded by the O-ring 40 and passes the screwdriver base 20. Also, the handle 10 has a front end 11 coupled to a screwdriver bit 2. The screwdriver base 20 includes a fixing base 21 and a fixing cylinder 22 connected to the fixing base 21.

This embodiment is different from the above embodiment at that the screwdriver base 20 is coupled to the handle 10. In the embodiment, the fixing base 21 is embedded in the handle 10, and the fixing base 22 protrudes out from the front end 11 of the handle 10. In addition, the fixing manner of the ring plug 30 being coupled in the screwdriver base 20 is the same as the aforementioned description, so it will not be repeated.

While this disclosure has been described by means of specific embodiments, numerous modifications and variations could be made thereto by those skilled in the art without departing from the scope and spirit of this disclosure set forth in the claims.

What is claimed is:

1. A screwdriver bit coupling structure (1) of hand tool, used for coupling a screwdriver bit (2), comprising:

a handle (10), comprising a front end (11) for coupling the screwdriver bit (2);

a screwdriver base (20), comprising a fixing base (21) and a fixing cylinder (22) connected to the fixing base (21), the fixing cylinder (22) comprising an embedding recess (221) and an engaging recess (222) communicated with the embedding recess (221), the screwdriver base (20) being coupled to the handle (10), and the fixing cylinder (22) comprising an outer end edge (223);

a ring plug (30), made of an insulative material, comprising an elastic segment (31) and an abutting segment (32) connected to the elastic segment (31), the elastic segment (31) being inserted into the engaging recess (222), the abutting segment abutting against the engaging recess (222) and being pressed by the outer end edge (223) of the fixing cylinder (22); and an O-ring (40), disposed between an outer surface of the elastic segment (31) and an inner surface of the engaging recess (222), wherein the screwdriver bit (2) is inserted into the embedding recess (221) through the ring plug (30), the screwdriver bit (2) is pressed by the elastic segment (31) to be fixed in the engaging recess (222).

2. The screwdriver bit coupling structure of hand tool of claim 1, wherein the elastic segment (31) is disposed with a groove (33).

3. The screwdriver bit coupling structure of hand tool of claim 2, wherein the elastic segment (31) comprises a plurality of elastic claws (311), and the groove (33) is defined on the elastic claws (311).

4. The screwdriver bit coupling structure of hand tool of claim 3, wherein the groove (33) is configured to be of an arcuate or V shape.

5. The screwdriver bit coupling structure of hand tool of claim 3, wherein the O-ring (40) is disposed in the groove (33) and sleeves the elastic segment (31).

6. The screwdriver bit coupling structure of hand tool of claim 1, wherein the ring plug (30) comprises a hollow portion (300) and is configured to be of a hexagonal shape, and the embedding recess (221) is configured to be of a hexagonal shape.

7. The screwdriver bit coupling structure of hand tool of claim 1, wherein a step (220) is formed between the embedding recess (221) and the engaging recess (222), and the elastic segment (31) abuts against the step (220).

8. The screwdriver bit coupling structure of hand tool of claim 1, wherein the ring plug (30) and the O-ring (40) are made of plastic.

9. The screwdriver bit coupling structure of hand tool of claim 1, wherein the fixing base (21) and the fixing cylinder (22) are embedded in the handle (10).

10. The screwdriver bit coupling structure of hand tool of claim 1, wherein the fixing base (21) is embedded in the handle (10), and the fixing cylinder (22) protrudes out from the front end (11) of the handle (10).

* * * * *